FIG. 1

INVENTORS
MELVIN G. CRANDELL
DONALD L. PEASE

ATTORNEYS

United States Patent Office 3,567,214
Patented Mar. 2, 1971

3,567,214
SHEET FEEDING AND SEPARATING APPARATUS
Melvin G. Crandell, Walworth, and Donald L. Pease, Marion, N.Y., assignors to Xerox Corporation, Rochester, N.Y.
Filed June 10, 1968, Ser. No. 735,669
Int. Cl. B65h 3/46
U.S. Cl. 271—10                                  10 Claims

ABSTRACT OF THE DISCLOSURE

A sheet feeding and separating assembly including a conveyor roll, reject roll and an urging roll. The conveyor roll is driven in a sheet feeding direction while a cooperating reject roll is driven in a sheet rejecting direction through a slip clutch to ensure forwarding only single sheets. Motion of a sheet beyond these rolls inactivates the drive to the conveyor roll so that the reject roll will counter-rotate the conveyor roll after the passage of the fed sheet. The introduction of the next sheet into the nip is effected through an urging roll which moves into and out of driving contact with the topmost sheet of the stack under the influence of the rotation of the conveyor roll.

---

This invention relates to sheet feeding and separating and in particular to apparatus for sequentially feeding the topmost sheet from a stack of documents in a programmed fashion wherein the apparatus has the capability to prohibit the feeding of more than one sheet.

In the specifications of U.S. Pats. 3,044,770 to T. P. C. Breuers and 3,272,500 to C. J. Van Dalen et al., devices are described which are capable of continuously feeding out single sheets from a stack of sheets. Such devices include a sheet separating station having a conveyor roll and a reject roll to insure that plural overlapped sheets are not forwarded. Prevention of a double sheet feed is accomplished by continually driving the conveyor roll in the sheet feeding direction while continually rotating the reject roll in a sheet rejecting direction, the reject roll being driven through a slip clutch. With the proper slip clutch in the system, the friction between the conveyor roll, reject roll and the single sheet being fed will allow the conveyor roll to frictionally drive the reject roll in the sheet feeding direction against the direction of urging of the slip clutch. If, however, plural sheets enter the nip between the conveyor and reject rolls, the plural sheets effect a decreased frictional force between the rolls so that the slip clutch may take over the counter rotating of the reject roll and thereby return the supplemental sheet or sheets from the nip to the stack. In this manner the feeding of single sheets is assured. Motion of the subsequent sheets into the nip is caused by either gravity or a continuously operated conveyor device.

Devices of this type are satisfactory for sheet feeding and separating functions where a continuous feeding of sheets in end-to-end fashion is desired. When, however, it is necessary to feed out single sheets in a timed or otherwise programmed fashion so that the movement of the fed sheet does immediately cause the feeding of the next subsequent sheet, such devices are inadequate.

Due to the fact that the above-described devices automatically commence the feeding of the next subsequent sheet upon or before the passage of the fed sheet, the feeding of only a single sheet without disturbing the rest of the sheets in the stack is impractical. The use of a sheet sensing device to inactivate the entire feeding and separating apparatus cannot adequately be employed to insure the feeding of a single sheet. This is because the fed sheets are moving in such close fashion that a trailing edge of a sheet is often overlapped by the leading edge of the following sheet. Furthermore, the extremely rapid activation and inactivation of the driving mechanisms which would be required in such a system would make such a proposal impractical from an engineering standpoint. The use of a continuous operating conveyor belt or urging roll on the topmost sheet of a stack is, in like manner, inappropriate for such programmed feeding of merely a single sheet because such an urging conveyor would have to be located in contact with the topmost sheet of the stack. When the topmost sheet is fed between the conveyor and reject rolls, it would begin its movement from the stack and thus permit the urging conveyor to contact and move the second sheet before the complete passage of the first sheet from the stack. This inherently results in the buckling of sheets immediately in advance of the conveyor and reject rolls as well as the continual feeding of the second sheet prior to the complete feeding of the first sheet. The other prior art technique for feeding single documents to the separating rolls includes the use of gravity as permitted by the inclination of the stack towards the roll. This is the most ineffective of all techniques since no positive driving force is employed.

The present invention is directed to apparatus for overcoming the above-described shortcomings. According to the present invention, documents are fed one at a time to and through a sheet feeding and separating station. The separating station, as above, includes a conveyor roll and a reject roll operative through a slip clutch for preventing passages of plural sheets. But, according to the instant invention, once the leading edge of a sheet passes beyond the nip of the sheet separating rolls, a supplemental conveyor takes over the conveying of the sheet. The drive to the conveyor roll is then inactivated while the sheet is still in the nip. Thus, when the trailing edge of the sheet passes beyond the nip, the reject roll counter-rotates the conveyor roll to prevent the next subsequent sheet or sheets from entering the nip. The counter-rotation of the conveyor roll also acts to lift the urging roll from the stack of documents as further insurance in the prevention of a subsequent sheet being fed into the nip. After the urging roll is lifted, the reject roll is inactivated. Upon reactivation of the conveyor and reject rolls, as in the programmed or automatic fashion, the conveyor roll will rotate to drop and rotate the urging roll for feeding the next subsequent single sheet from the stack. In this manner, it is possible to take advantage of a sheet feeding and separating station employing a slip clutch operated reject roll while yet permitting the programmed feeding of only single sheets from a stack in end-to-end spaced relationship, that is, with the leading edge of a sheet following the trailing edge of the preceding sheet with a space therebetween and with the trailing edge of the sheet being followed by the leading edge of the next sheet with a space therebetween.

It is therefore an object of the present invention to feed single sheets from a stack of sheet material.

It is a further object of the instant invention to sequentially feed sheets one at a time from a stack of sheets while rejecting double sheet feed.

It is a further object of the instant invention to sequentially feed single sheets from a stack of sheets in a programmed fashion.

It is a further object of the invention to sequentially introduce the topmost sheet from a stack of sheets into a sheet feeding and separating nip by means of an urging roller moved into and out of contact with the topmost sheet of the stack in a programmed fashion.

It is a further object of the instant invention to feed single sheets out of a nip between a conveyor and reject roll and to counter-rotate the feed and reject rolls after the passage of the trailing edge of the sheet to prohibit the introduction of the next sheet into the nip.

It is a further object of the instant invention to operate a sheet urging roll from the motion of a sheet conveyor roll.

It is a further object of the invention to inactivate a sheet feeding and separating station after its forwarding of a single sheet and to reactivate the station for forwarding the next subsequent sheet in a stack upon a predetermined signal.

These and other objects of the instant invention are achieved by a conveyor roll, a reject roll, and an urging roll. The conveyor roll is driven in a sheet feeding direction through a one-way overriding clutch. It operates in cooperation with the reject roll which is driven in a sheet rejecting direction through a slip clutch. The interrelationship of these rolls permits the feeding of single sheets while effecting the rejection of a double sheet feed. As the fed sheet moves beyond the nip it is conveyed by a supplemental conveyor while the drive to the conveyor roll is inactivated so that the reject roll will counter-rotate the conveyor roll after the passage of the single sheet. This motion will prohibit the motion of subsequent sheets into the nip and will also counter-rotate an urging roll out of contact with the topmost sheet in the stack. The drive to the reject roll is then inactivated. A programmed reactivation of the conveyor and reject rolls will act to bring the rotating urging roll into contact with the next topmost document of the stack and to reinitiate the entire sheet feeding cycle.

For a better understanding of the invention as well as other objects and further features thereof, reference is had to the following detailed description of the invention to be read in connection with the accompanying drawings, wherein.

Figure 1:
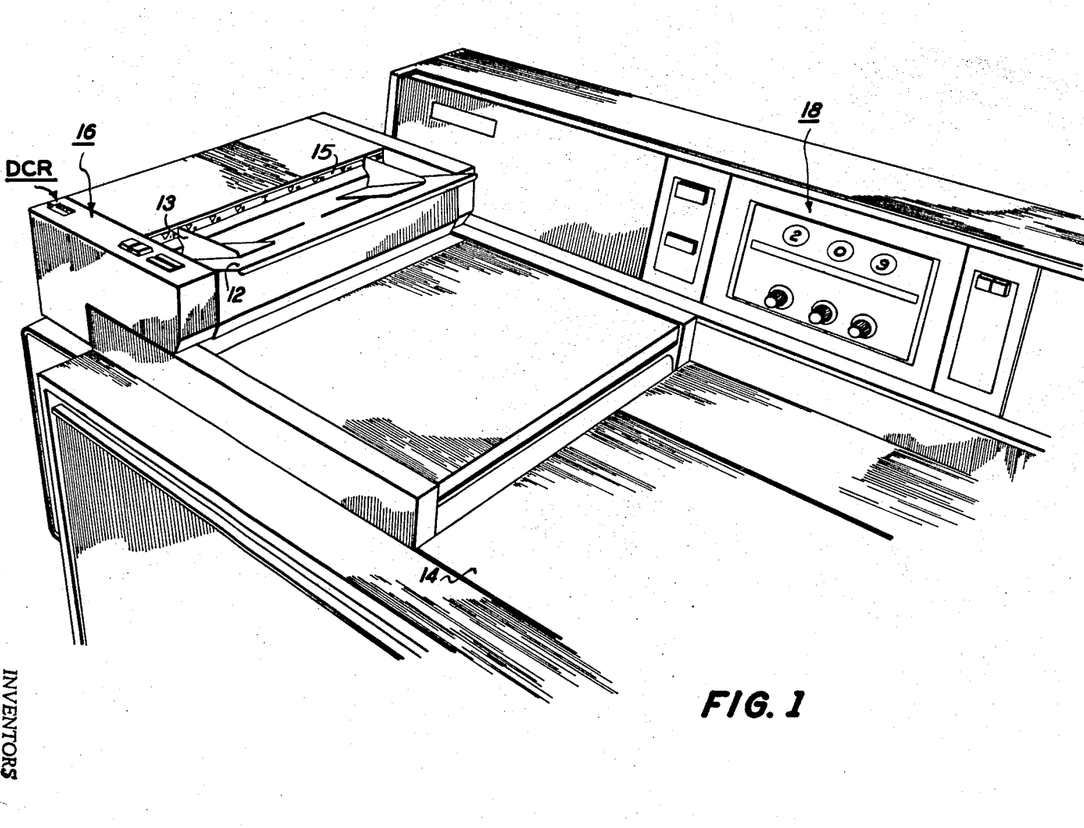
FIG. 1 is a perspective view of an automatic document feeder constructed in accordance with the instant invention operatively mounted on a continuous and automatic xerographic reproducing machine.

Shown in FIG. 1 is an automatic xerographic reproducing machine of the type disclosed in U.S. Pat. 3,301,126 to Osborne et al. Shown in association therewith is an automatic document feeder which may be used in association therewith for automatically bringing documents to be xerographically reproduced into location for being scanned by the xerographic machine.

Documents to be scanned by the xerographic machine are positioned on a glass platen 10. In order to automatically change the documents on the platen for being reproduced, there is provided the automatic document feeding apparatus of the instant invention. The automatic document feeder, or ADF as it will be referred to herein, is interrelated with the operations of the xerographic reproducing machine in a manner to be later described.

The automatic document feeder is loaded by placing a plurality of documents to be fed in a tray area 12. The tray area 12 includes a pair of edge guides 13 having flat base portions and upstanding edge guides at right angles thereto. The edge guides 13 are mounted in slots in the tray area for independently sliding toward and away from each other. In this manner, the edge guides may be adjusted for accommodating documents of varying sizes. A ruler 15 is located on the cover of the document feeder above the document entrance slot so that the edge guides 13 may be adjusted equally distant from the center of the tray 12. In this manner the edge guides are adjustable for various length documents to be forwarded and reproduced. The edge guides may be provided with resilient retention means for keeping them in position once they have been adjusted. The sides of the documents which are to be xerographically reproduced are placed face up with the first document to be xerographically reproduced on the top of the stack. The mechanisms of the device then sequentially transport the documents to the platen 10 for scanning and then beyond to a document receiving station 14 on the xerographic reproducing machine. The automatic document feeder is provided with a control panel 16 while the xerographic reproducing machine retains its control panel 18 as described in the aforementioned Osborne et al. patent.

Figure 3:
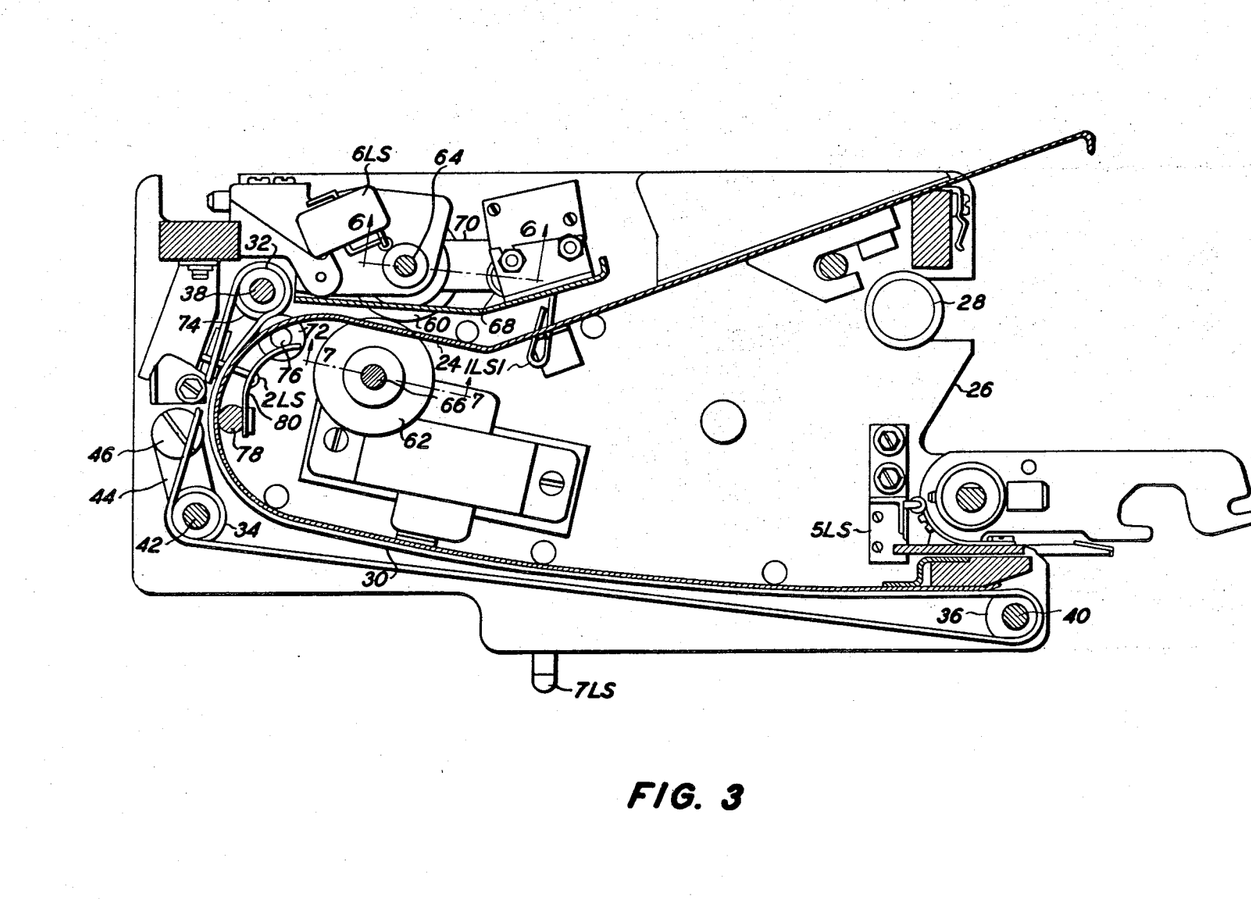
FIG. 3 illustrates schematically a portion of the document feeding elements.
Figure 4:
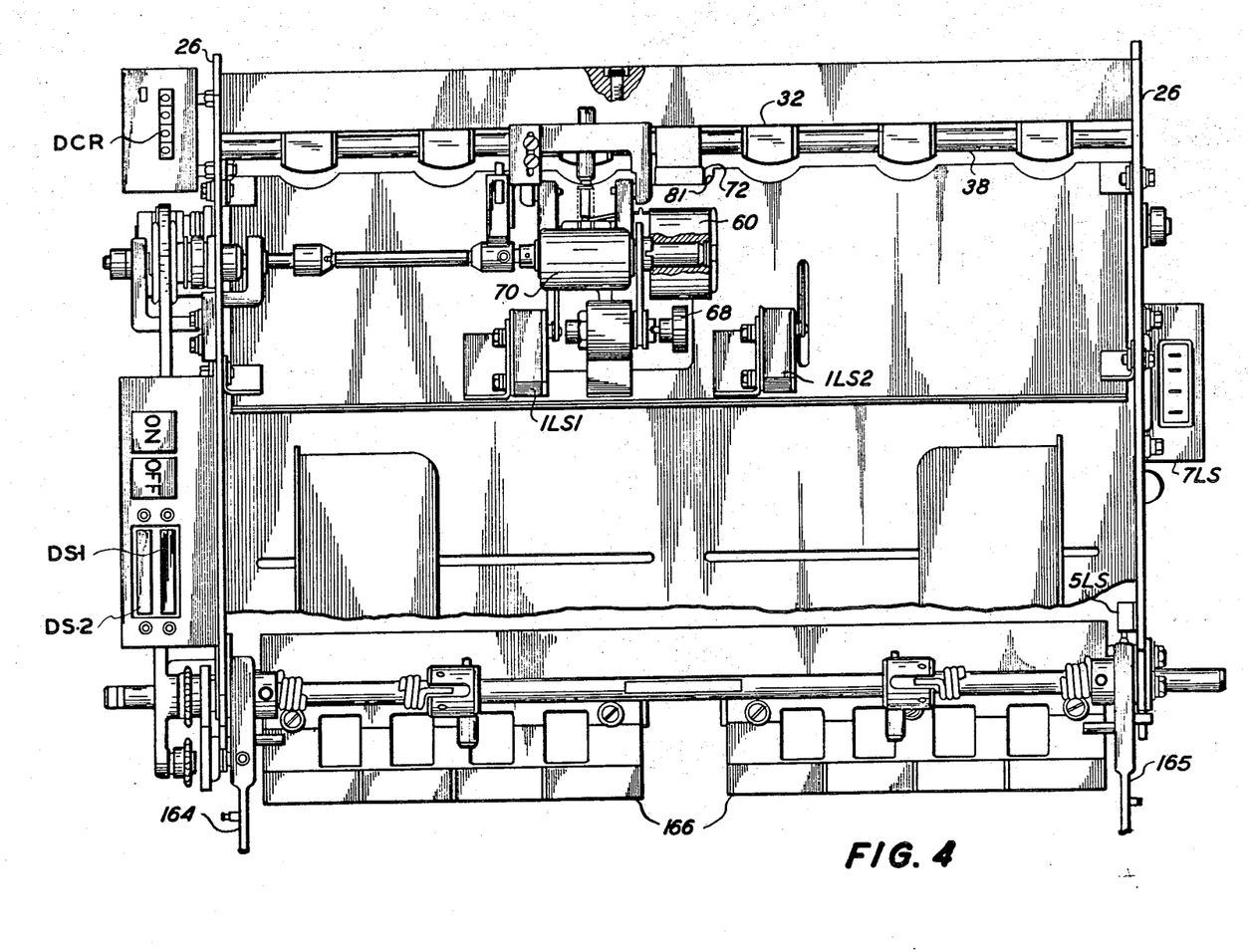
FIG. 4 is a top view of the document feeding mechanisms shown in FIG. 3.
Figure 5:
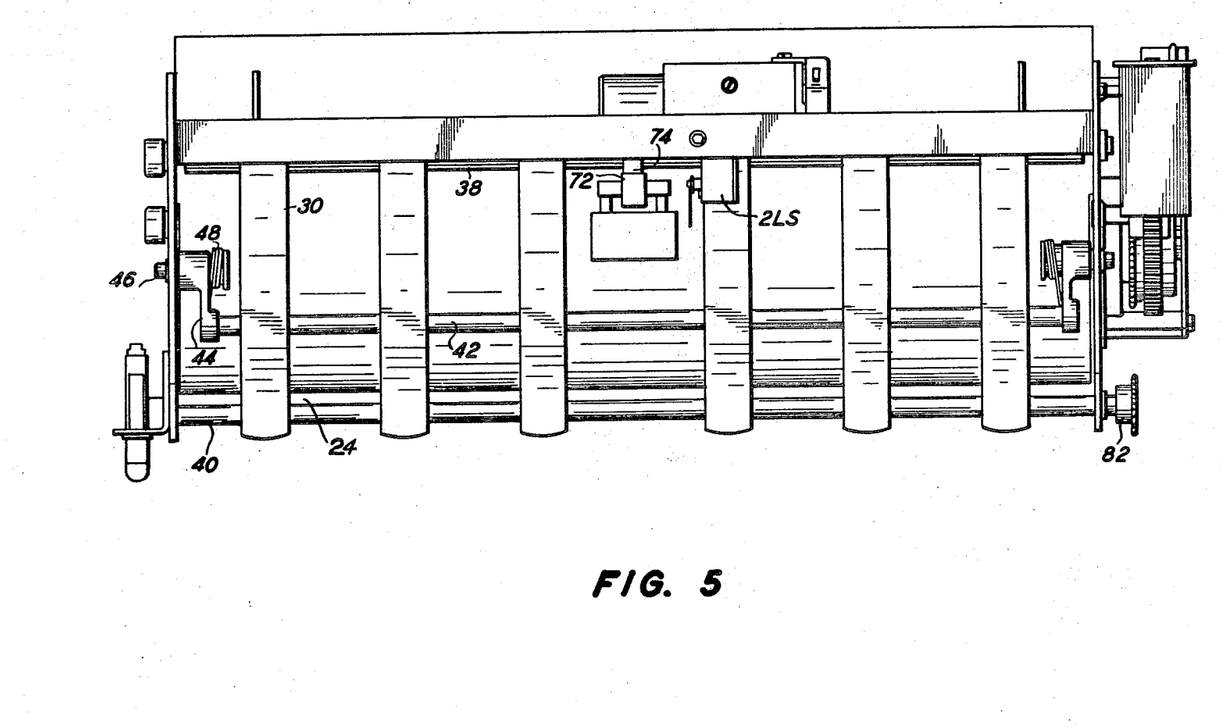
FIG. 5 is a left hand view of the document feeding mechanism shown in FIG. 3.
Figure 8:
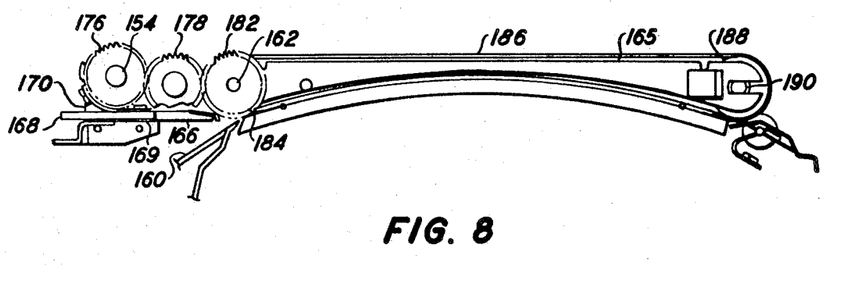
FIG. 8 is a side view of an additional portion of the sheet feed mechanisms shown in FIG. 2.
Figure 9:
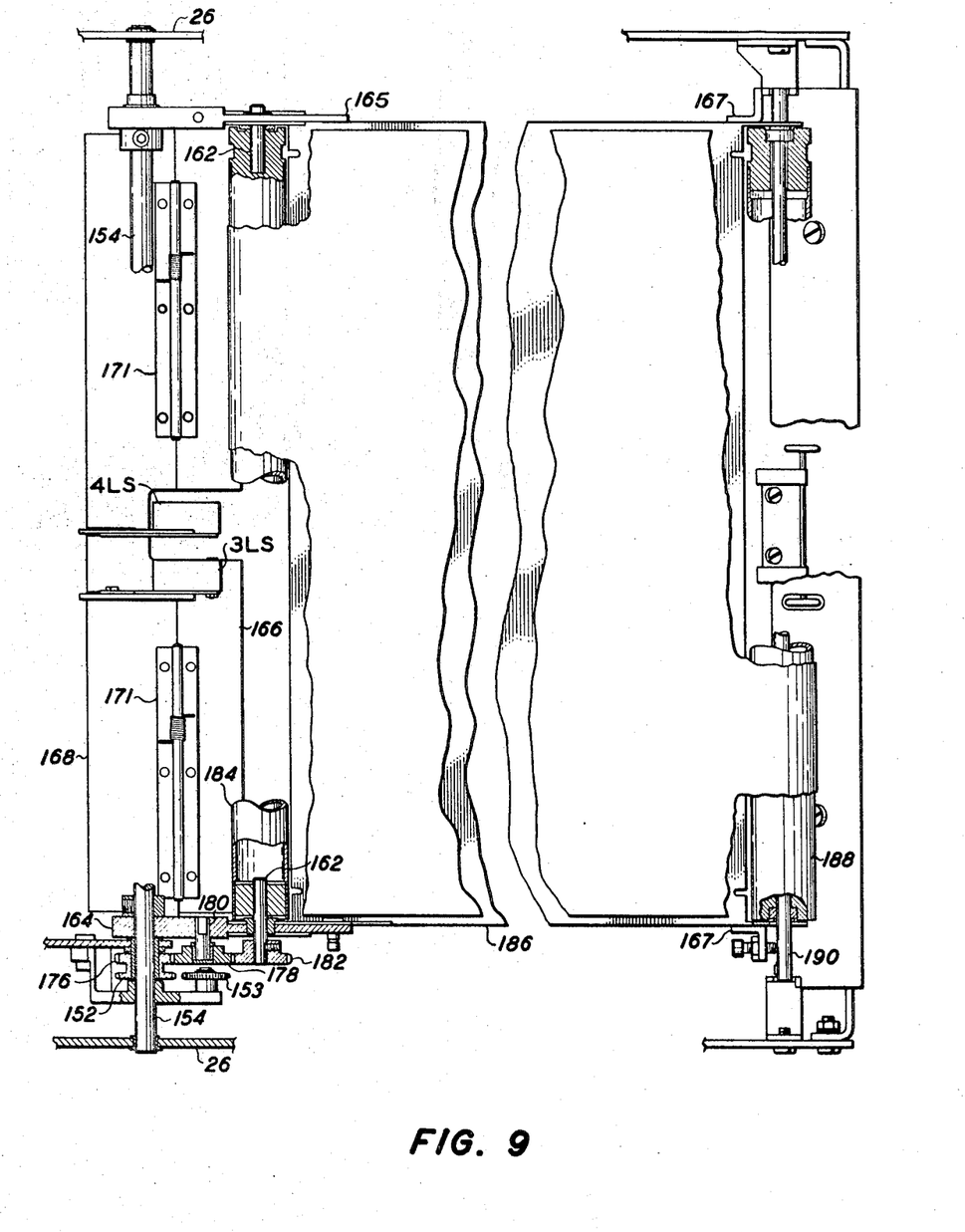
FIG. 9 is a top view of the document feed mechanism shown in FIG. 8.

The automatic document feeder is constructed of two basic sections. The first of these sections, as shown more specifically in FIGS. 3–5, is the intermediate transport section 20. The second of these is the platen belt transport section 22 as specifically shown in FIGS. 8 and 9. These two sections are mounted on the machine for functioning in a unitary manner to convey documents from the document tray 12 to the platen 10 and then beyond after the xerographic scanning.

The document receiving tray is formed of a sheet metal paper guide 24 which extends from the paper supporting area through an arcuate paper guiding path to the platen area. The guide is supported on opposite sides by a pair of side plates 26. The side plates in turn are mounted on a support shaft 28 which is fixedly mounted with respect to the feeder side plates.

The arcuate paper guiding plate 24 cooperates with a plurality of intermediate transport belts 30 to frictionally move the documents from the tray area to the platen 10 of the xerographic reproducing machine. The intermediate transport belts are supported for movement by sets of rollers 32, 34 and 36. Rollers 32 are supported on a rotatable shaft 38 mounted on the side plates 26. Rollers 36 are similarly mounted on a shaft 40 which is also mounted between side plates 26. The rollers 34 are secured on a rotatable shaft 42, which, as can be seen in FIG. 5, is mounted to the side plates 26 through support arm 44 and a pivotable support member 46. Support member 46 retains a coil spring 48 to outwardly urge roller 34 to maintain the belt 30 in a state of tension.

The documents to be reproduced are positioned on the upper portion of the arcuate paper guide 24 with their lead edges adjacent a pair of separating rollers. These rollers include a conveyor roller 60 and a reject roller 62. The conveyor roll and reject roll are supported on shafts 64 and 66 in a manner to be later described. Associated with the conveyor roll is an urging roll 68 mounted on the urging roll arm 70. This urging roll 68 is reciprocable toward and away from a stack of documents through arm 70 to give an initial movement of the topmost sheet into the sheet separating station. The reject roll can cooperate with the conveyor roll through an aperture in the arcuate paper guide 24.

Once a single document being conveyed has been moved beyond the conveyor and reject rolls 60 and 62, its feeding is achieved by the action of the intermediate transport belts 30. The belts first pick up the leading edge of the document at the nip between pinch rolls 72 and 74. Pinch roll 72 is freely rotatable on shaft 76 which is mounted on tie beams 78. Tie beam 78 is fixedly secured to the arcuate paper guide 24 and positions shaft 76 through a resilient support 80 to urge the pinch roll 72 into contact with its associating roll 74. It is noted that the pinch roll 72 contacts pinch rolls 74 through an aperture 81 in the paper guide. The motion between the pinch rolls is imparted by the intermediate transport belts 30 which rotate shaft 38 upon which pinch roll 74 is supported. Motive power is supplied to the intermediate transport belt assembly through drive gear 82 which is operatively connected to the motor MOT-1 through drive chain 84.

Figure 6:
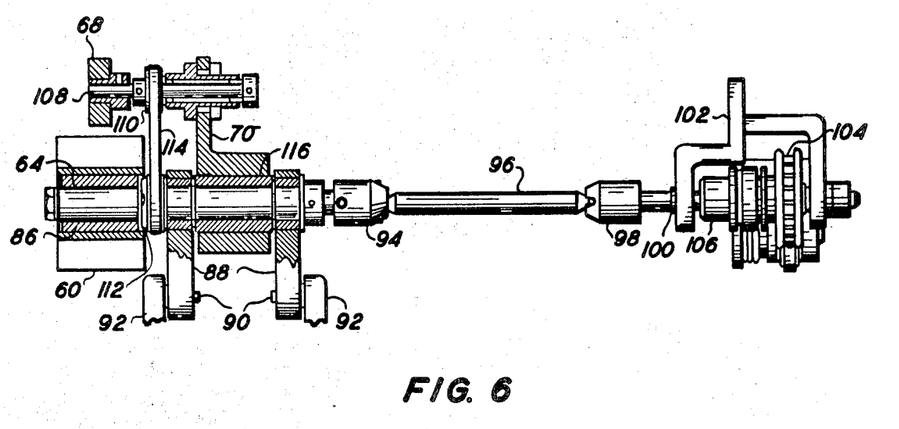
FIG. 6 is a sectional view taken along lines 6—6 of FIG. 3.
Figure 7:
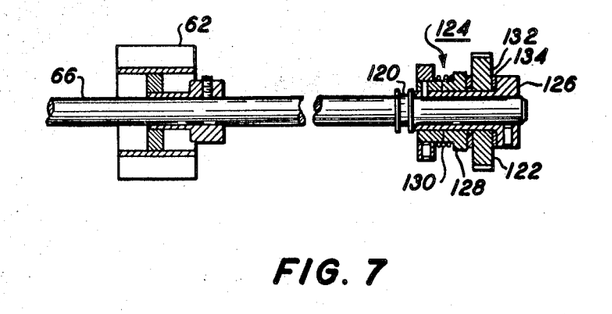
FIG. 7 is a sectional view taken along lines 7—7 of FIG. 3.

Reference is now had to FIGS. 3, 6 and 7 which are directed to the conveyor roll 60, reject roll 62, and urging roll 68 which initiate the movement of the document from the stack to the intermediate transport belt and assure that only single documents will be advanced.

The conveyor roll 60 and reject roll 62 which functions with urging roll 68 to advance single sheets for movement by the intermediate transport belts 30 are more clearly seen in FIGS. 6 and 7. As shown in FIG. 6, the conveyor roll is mounted on shaft 64 through a one-way over-riding clutch 86 for driving the conveyor roll in a sheet feeding direction. When the conveyor roll 60 is rotated against the sheet feeding direction by the action of reject roll 62 in a manner to be later described, the shaft 64 will be locked therewith to be rotated against a sheet feeding direction as permitted through the engagement of the one-way over-riding clutch 86. Shaft 64 is mounted for rotation in apertures of pivot support bars 88 which are, in turn, pivotally mounted on rods 90. Rods 90 are fixed with respect to the housing by casting extensions 92. This type of a pivotal mounting of shaft 64 permits the conveyor roller to rise and lower under the influence of thick or thin documents being transported. The shaft 64 includes a flexible coupling extension 94, 96 and 98 which permits the application of power to the conveyor roll during the slight raising and lowering of the conveyor roll as sometimes occurs. The flexible coupling assembly is mounted through a bearing 100 into a housing extension 102 and receives its power from pulley 104. An electric feed clutch 106 connects the drive pulley to the shaft 64 and conveyor roll 60 for a purpose to be later described.

The urging roll 68 is mounted in a fixed orientation with respect to the conveyor roll by urging roll arm 70. The urging roll 68 is supported on shaft 108 to which the urging roll is keyed. Motion is imparted to shaft 108 through pulley 110 cooperable with pulley 112 on shaft 64 through belt 114. By this arrangement, rotation of the conveyor roll 60 and shaft 64 rotates pulleys 112 and 110 through belt 114. The rotation of pulley 110 in like manner rotates the urging roll 68 in the same direction of rotation as the conveyor roll 60.

As can be seen in FIG. 6, conveyor roll shaft 64 is journaled in an enlarged aperture portion of the urging roll arm 70. This connection is made through a one-way clutch 116 so that the conveyor roll 60 and its supporting shaft 64 may freely rotate in a sheet feeding direction. When, however, the conveyor roll 60 reverses its direction, one-way overrunning clutch 86 causes shaft 64 to counter-rotate. This counter-rotation locks the one-way clutch 116 to pivot the urging roll arm 70 in a direction to lift shaft 108 which it is supporting. A lifting of shaft 108 lifts the urging roll away from the stack of documents on the tray.

Cooperating with the conveyor roll 60 to prohibit the advancing of more than one sheet is the sheet reject roll 62. This roll is keyed to shaft 66 for concurrent rotation therewith. Shaft 66 extends across the width of the document feeding assembly and is mounted on the opposed side plates 26 through bearing members 120. Drive pulley 122 imparts power to shaft 66 through a slip clutch assembly 124. The slip clutch assembly includes a first annular retaining collar 126 secured to the shaft 66. An annular slide portion 128 cooperates with coil spring 130 and collar 126 to urge annular portion 128 toward the drive pulley 122. Face plates 132 and 134 allow the frictional coupling between the drive pulley 124 and annular portion 128 to allow the rotation of collar 126 and consequently the shaft 66. The slip clutch assembly 124 is so adjusted that the rotation of the conveyor roll in contact with the reject roll 62 will rotate the reject roll 62 and shaft 66 in the sheet feeding direction under the influence of the rotation of the conveyor roll. This is against the direction of rotation being imparted to the conveyor roll by its pulley 122. The reject roll 62 also rotates in a sheet feeding direction when a single document is moved between the conveyor roll and reject roll. When, however, a plurality of sheets is fed between the conveyor and reject rolls 60, 62, there is an effective decrease in friction between these rolls due to the minimized friction between the sheets. This will permit the friction clutch 124 to cause engagement between drive pulley 122 and shaft 66 to rotate the reject roll in a sheet reject direction. This counter-rotation of the reject roll will drive the second or misfed sheet back to the tray area for a later feeding.

It is also possible for a misfeed to be in the form of a plurality of documents being introduced between the conveyor roll 60 and reject roll 62. If three or more documents should enter the nip between these rolls, the reduced friction force characterized by a sheet-to-sheet interface would again be present. And in a manner similar to that discussed above with respect to the misfeed of two sheets, the reject roll 62 would commence rotating in the sheet rejecting direction to begin rejecting all of the plural sheets back to the sheet supporting tray 12 until only a single document is present in the nip between these rolls. The sheets being rejected would be those in closest relationship to the reject roll which is being counter-rotated. Thus all of the misfed sheets would be returned to the tray until only a single document, that document in closest proximity to the feed roll 60, is forwarded. When only a single sheet, the topmost sheet of the stack which is in contact with the feed roll 60, is present between the rolls, rotation of the reject roll in the sheet feeding direction reoccurs as in the normal mode of operation.

Due to the fact that the conveyor roll 60 is resiliently urged toward the reject roll 62, this roll assembly is adapted to accommodate documents of varying thickness. And due to the fact that conveyor roll 60 is resiliently urged, a variation in the normal force applied between these rolls is provided. The variation in normal force permits a variation in the frictional force and because of this, the conveyor and reject rolls are operational to prohibit misfeeds over a wide range of paper thicknesses and paper frictions. In practice, the device functions well over a wide range of sheet types without adjustment of the resilient tension or properties of the slip clutch assembly 124.

Figure 10:
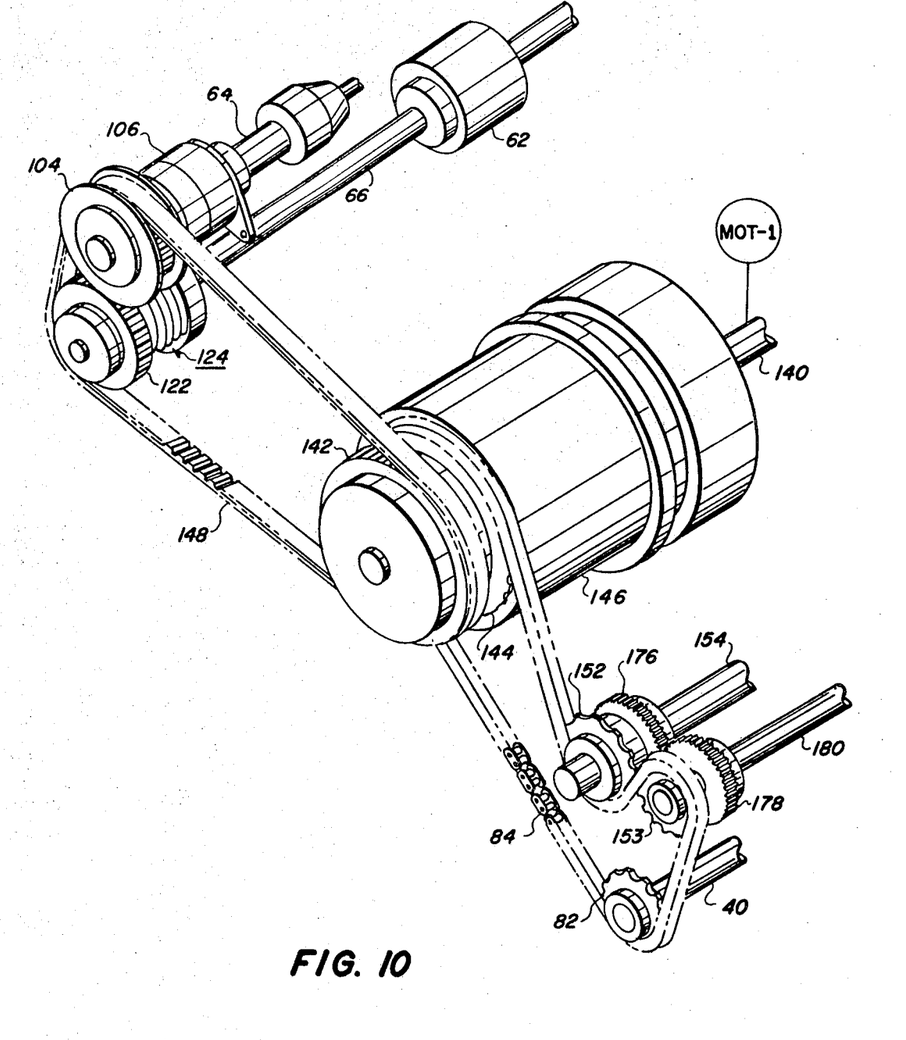
FIG. 10 is a schematic illustration of the motor and drive mechanisms of the document feeding apparatus.
Figure 11A:
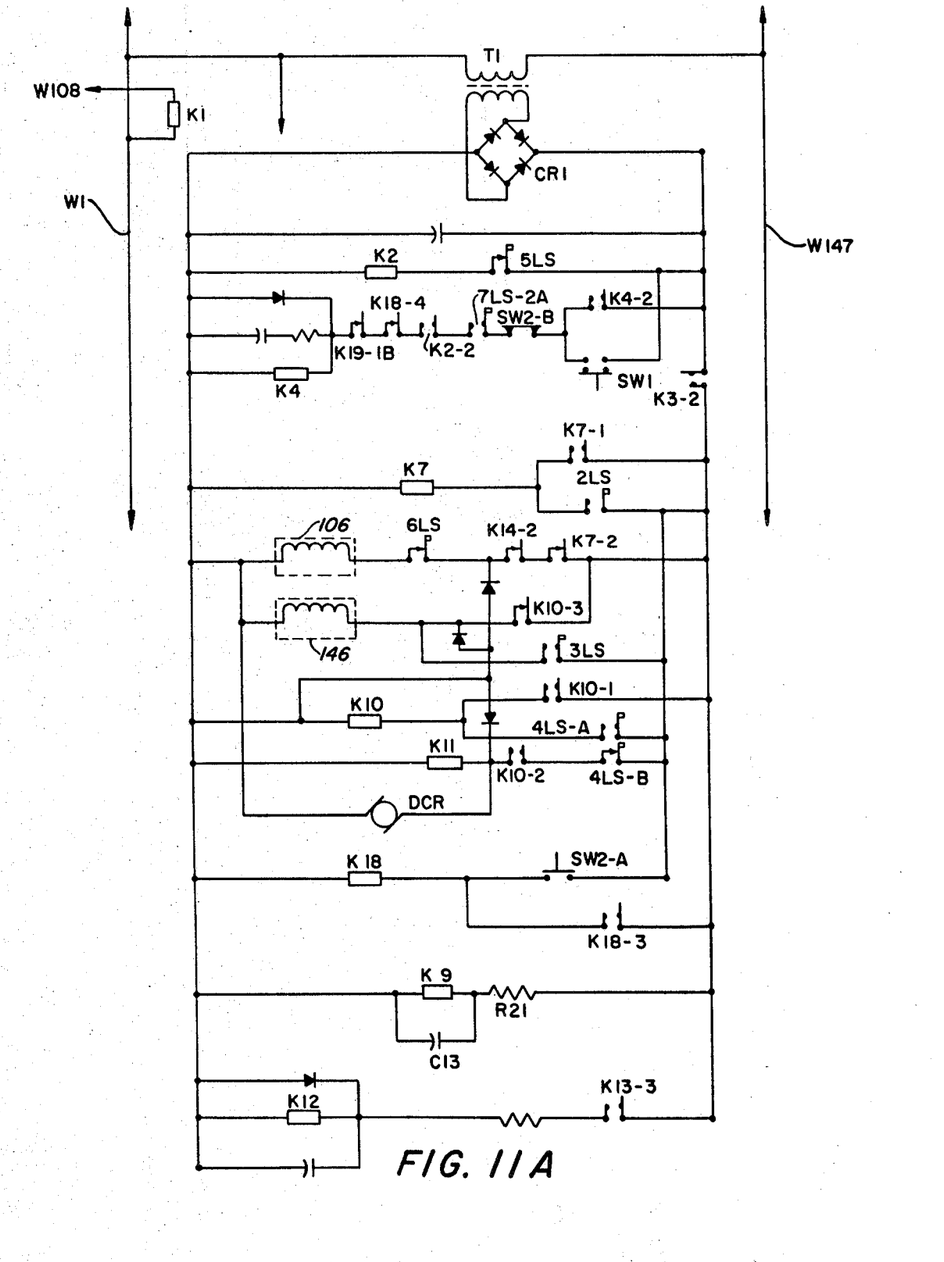
FIGS. 11a, 11b, 11c, and 11d are schematic electrical diagrams of the electrical components of the document feeding apparatus.
Figure 11B:
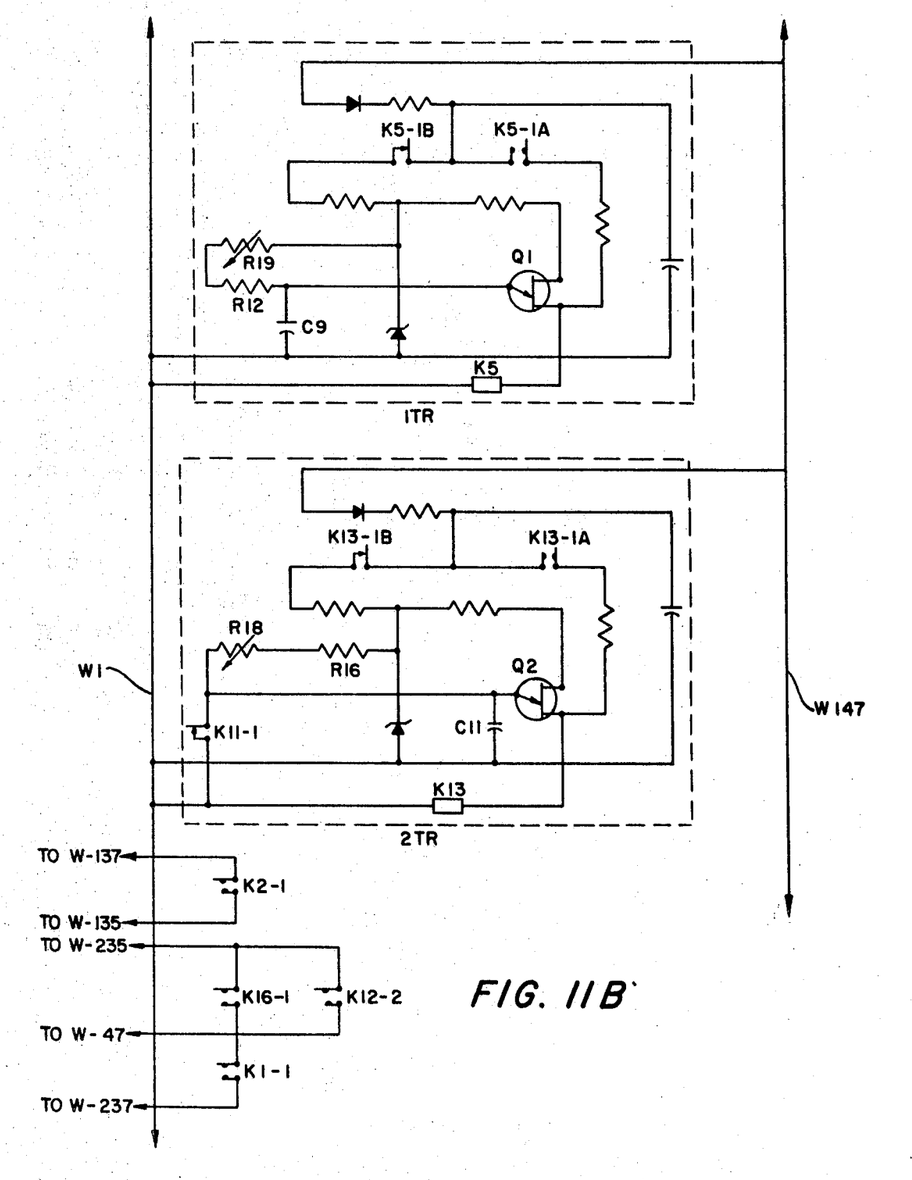
Figure 11C:
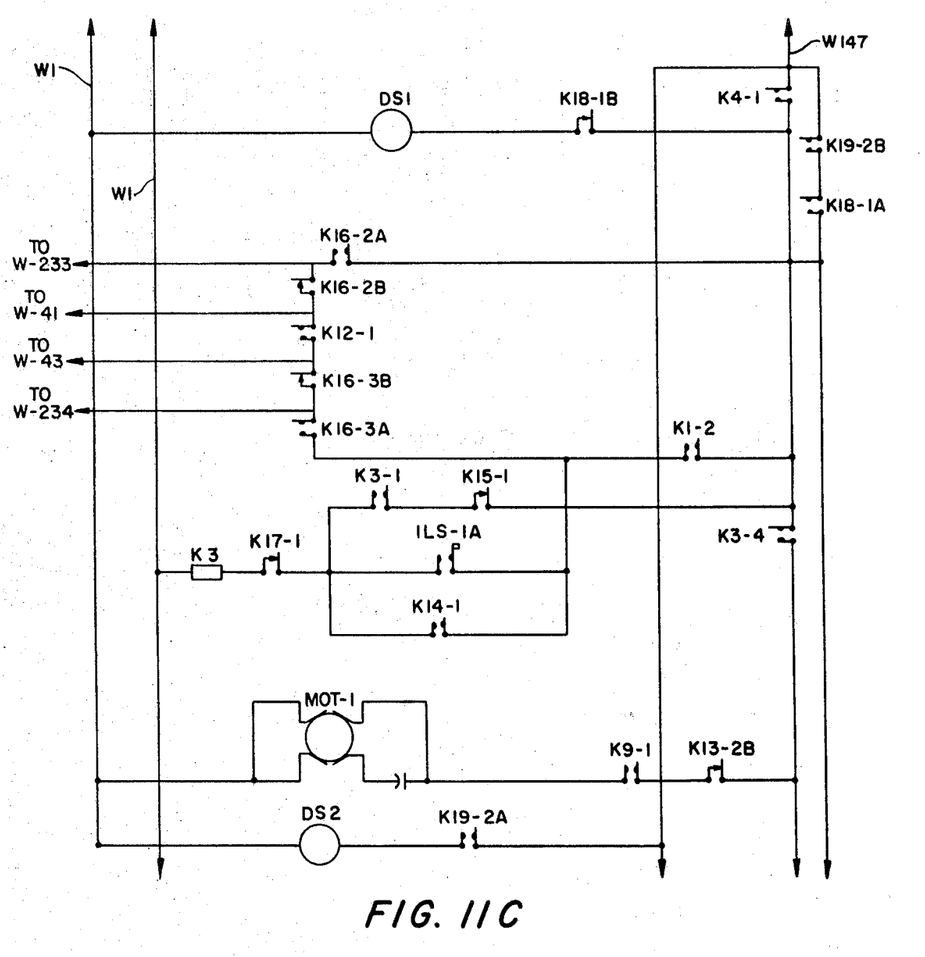
Figure 11D:
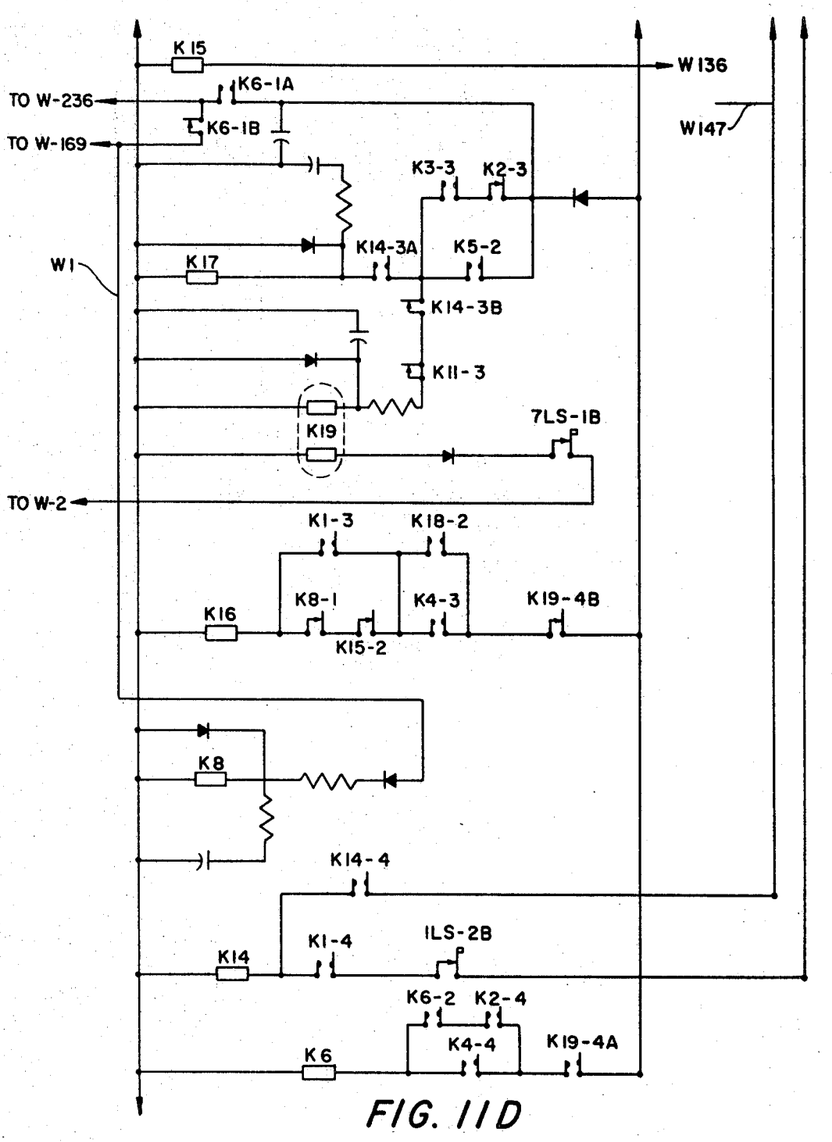

Power is applied to all of the drive elements of the automatic document feeder through MOT-1, shown schematically in FIG. 10. The motor has a main power shaft 140 supporting a pulley and gear 142 and 144. An intermediate power converting device in the form of a clutch and speed reducer 146 permits the changing of rotational speeds of the drive pulley and gear 142 and 144 while the motor operates at a single rotational speed. The pulley and gear 142 and 144 act to rotate an endless belt and chain 148 and 84, respectively. Belt 148 imparts the motive power to slip clutch 124 and reject roll 62 through pulley 122. Also in cooperative engagement with belt 148 is pulley 104 which rotates the conveyor roll 60 through the electric feed clutch 106. The chain 84, rotatable from drive gear 144, acts to rotate gear 82 to drive the intermediate transport belts 30. Chain 84 also rotates gear 152 which is the drive to the platen belt assembly 22. Gear 153 is an idler for chain tensioning and for ensuring proper gear direction.

The space between the intermediate transport belts 30 and the platen transport belt assembly 22 is bridged by a lead-in guide plate 160. Positioned above the lead-in guide plate is a pair of shafts 162 and the power pulley support shaft 154. Shaft 154 extends across the width of the document feeder and is secured in side plates 26 for providing a pivot point to lift the platen transport belt assembly as well as the intermediate transport assembly. Plate members 164 and 165 constitute a supplemental support assembly for retaining the various elements of the platen transport belt assembly in their proper orientation with respect to each other. Members 164 and 165 are mounted independently of the main side plates 26 for pivotal movement with respect thereto about shaft 154. This pivotal mounting of the platen transport belt assembly allows its movement away from the platen 10 so that individual documents may be placed on the platen for xerographic reproductions independent of the automatic feeding provided by the system.

In conjunction with reproducing individual documents, the system is provided with a manual registration plate 166 pivotally mounted to a slide plate 168. Registration plate 166 and slide plate 168 are mounted for horiontal sliding on a fixed machine extension plate 169. Leaf springs 170 are mounted at their first ends to the ends of slide plate 168 and at their second ends to side plate members 164 and 165. Thus, when the platen belt transport assembly is pivoted about shaft 154, the side plate members 164 pivot about shaft 154 to move the leaf spring in an arcuate path to slide the slide plate 168 and manual registration plate 167 on the fixed extension plate 169 until the manual registration plate is in proper orientation on the platen 10. A resilient spring connection 171 between the slide plate 168 and manual registration plate 167 permits the urging of the registration plate into intimate contact with the platen 10 for the manual placing of documents on the platen while the platen transport assembly is raised. Returning the platen transport assembly to the platen reverses the motion of side plate members 164 to retract leaf springs 170, slide plate 168 and registration plate 167 away from the platen so as not to cause interference with the automatic feeding of documents to the platen.

The platen transport belt 186 is constructed of an electrically insulating material having a coefficient of friction sufficiently high to permit the transportation of documents onto and across the platen 10. It is white in color so that those portions above the platen which are not documents will not cause dark reproductions through the xerographic reproducing machine. The use of the insulating material prohibits the build-up of static electric charges caused by the frictional movement of the belt across the glass platen.

As stated above, power is imparted to the platen transport belt assembly by chain 84 driving gear 152. Rotation of pulley 152 rotates gear 176. Rotation of gear 176, as well as chain rotated gear 153, rotates idler gear 178 which is mounted on a shaft extension 180 secured to the side plate members 164. Rotation of gear 178 in turn rotates gear 182 which is keyed to shaft 162 which provides power to one of the rollers, 184, upon which the intermediate conveyor belt 186 is mounted. Mounted in parallel relationship with roller 184 is supplemental roller 188. Belt 186 spans driven roller 184 and idler roller 188. Roller 188 is mounted on shaft 190 which is journaled on opposed frame portions 167 for the pivotal movement of the intermediate transport belt assembly away from the platen 10.

From the overall viewpoint, the operation of the automatic document feeder begins with the operator placing a stack of documents to be reproduced on the document tray 12 with their leading edges between the urging roll 68 and the conveyor roll 60. The side of the document to be reproduced is face up with the first document to be reproduced on top of the stack. The pressing of the "POWER ON" button of the copier followed by pressing the "FEEDER ON" and "START-PRINT" buttons of will cause the motor MOT-1 to rotate the conveyor roll 60 and reject roll 62 in opposed directions due to the orientation of belt 148 with respect to their power pulleys 104 and 122, respectively. But due to the absence of plural sheets between the conveyor roll and reject roll, the reject roll will rotate against the slip clutch 124 in a direction of document feed under the influence of the rotation of the conveyor roll 60. The rotation of the conveyor roll acts to lower the previously raised urging roll from its elevated position into contact with the documents to be forwarded under the action of one-way clutch 116. The urging roll is also caused to rotate in a sheet feeding rotation through the rotation of belt 114. This action will forward the topmost document into contact with the rotating conveyor and reject rolls.

If only one sheet is moved between the conveyor and reject rolls, that sheet is advanced by the rolls until it is forwarded into the nip between faster moving rolls 72 and 74. At that time, the intermediate transport belts take over the feeding of the document at a rate faster than the rate of rotation of the conveyor and friction rolls.

As stated above, the clutch 86 has an overrunning characteristic in the direction of feed. Thus, when the document fed therefrom is picked up by the intermediate transport belts and moves at a faster rate than the rotational rate of conveyor roll 60, clutch 86 will permit the rotation of the conveyor roll to be faster than the speed of rotation as imparted by drive shaft 64. If this clutch 86 were not an overrunning clutch, the intermediate transport belt would have a tendency to tear the documents out of the nip between the conveyor and reject rolls 60 and 62.

If plural sheets are fed between the conveyor and reject rolls, the slippage between the sheets permits the friction roll to reverse its direction under the influence of slip clutch 124 to move the second sheet back to the document tray. After this time, the first sheet then continues being fed in a manner set out in the preceding paragraph.

As the leading edge of the conveyed document strikes the actuating arm of limit switch 2LS, the electric feed clutch 106 is inactivated so that the intermediate transport belts advancing the sheet allow the sheet to rotate both the conveyor roll and reject roll in a sheet feeding direction.

After the trailing edge of the fed document has moved beyond the conveyor and reject rolls, the impetus of the reject roll causes the idling conveyor roll to reverse its direction. This will cause any leading edge of a supplemental document contacting the conveyor and reject roll to be pushed back into the document tray. The reverse rotation of the conveyor roll will also counter-rotate shaft 64 under the influence of one-way clutch 86. The counter-rotation of shaft 64 will also raise urging roll arm 70 with urging roll 68 out of contact from the stack of documents under the action of one-way clutch 116. Similarly, the counter-rotation of belt 114 will counter-rotate the urging roll 68.

The movement of the document to be reproduced past the actuating arm of 3LS will cause a programmed slow-down of the intermediate transport belt 30 and platen transport belt 186 through the tripping of speed reducer 146. The passage of the document past 4LS in like turn will cause the stoppage of the motor MOT-1 and all of the driving elements of the system after a predetermined timed delay to stop the document in registration of the platen.

The automatic reproducing machine will then scan the document either once or a plurality of times as determined by the operator's programming of the reproducing machine's console 18. After the last scan is made, the belts are reactivated through the energization of motor MOT-1 to eject the document from the platen and to restart the above-described cycle to bring a second document to the platen for scanning. This new cycle acts to energize the motor MOT-1, the electrical feed clutch 106, to rotate the conveyor roll and drop the urging roll 68 into contact with the next sheet to be forwarded. This cycle will be repeated until the actuator arms of limit switches 1LS-1 and 1LS-2 sense the absense of documents on the tray 12. At this time the last document is reproduced a number of times as determined by the copier machine and then ejected while the copier and feeder go into a shut-down cycle.

Shown in FIGS. 11a, 11b, 11c and 11d is an electrical schematic of the apparatus which gives the document feeder its programmed functions. The arrowed portions extending vertically on the left side of FIGS. 11a–d show the electrical connections between the document feeder circuitry and the logic circuitry described in the xerographic reproducing machine of the aforementioned Osborne et al. patent.

Figure 2:
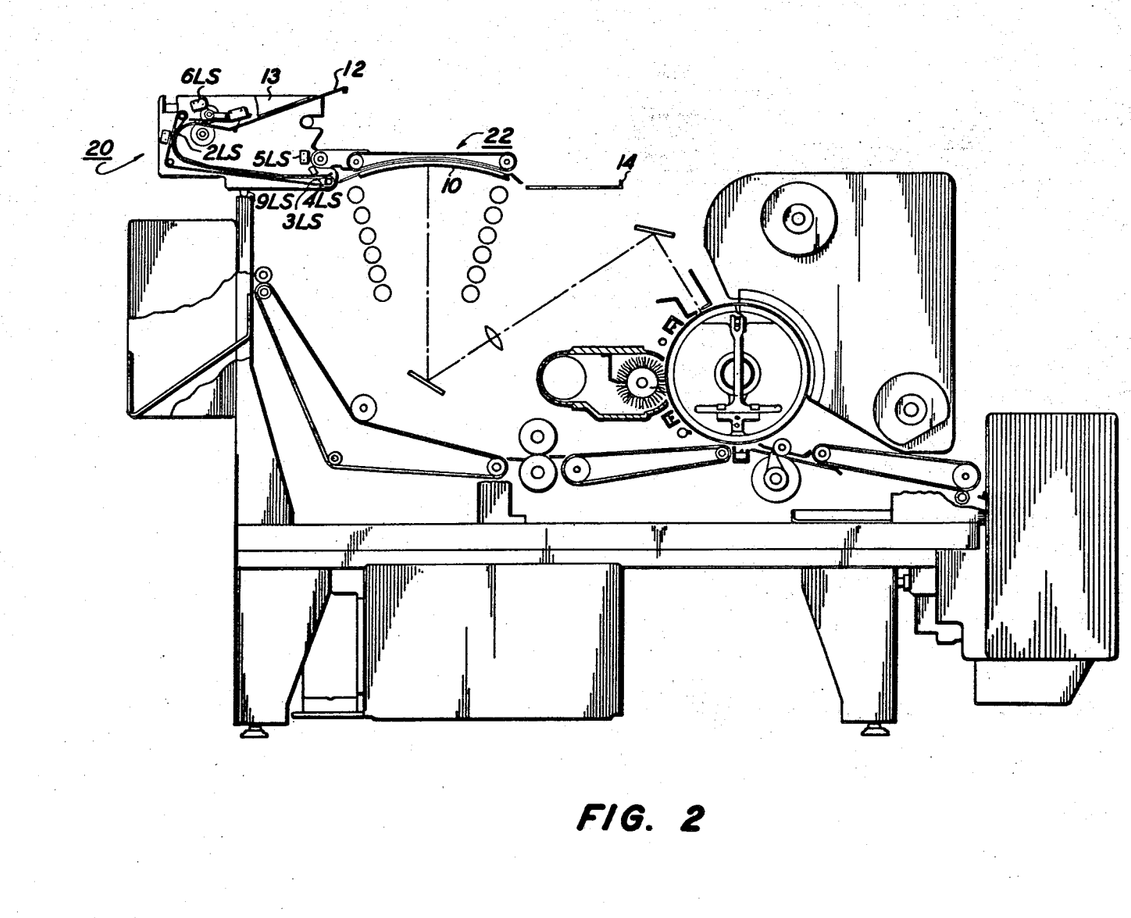
FIG. 2 illustrates schematically a preferred embodiment of the document feeding apparatus constructed in accordance with the invention in association with a continuous and automatic producing machine.

Shown in FIG. 2 is a schematic illustration of the xerographic reproducing machine and document feeder positioned together. The hereinafter described limit switches (LS's), along with their actuator arms, are shown therein and in FIGS. 2 and 3 to illustrate their physical locations on the document feeder. The automatic document feeder and the reproducing machine are electrically coupled, in a manner to be described, so that a malfunction in the reproducing machine will shut down the automatic document feeder while a malfunction in the document feeder will inactivate the reproducing machine.

Limit switches 1LS-1 and 1LS-2 have their associated actuator arms extending through apertures in the document tray. These limit switches function to indicate the presence of documents sufficiently forward in the tray ready for feeding and for the control of last document ejection.

Limit switch 6LS is a malfunction indicator which senses that a bulk thickness of documents is being fed from the document tray. Improperly fed documents which have a larger than normal thickness raise roll 60 and shaft 64 to trip the actuator arm of 6LS and hold its contact in the closed position for an extended period. This disables the feed clutch 106, preventing further motion of the fed paper. Thus, after a period of time determined by the 1TR jam timer, a document jam indication will be noted on the console. The passage of a properly fed single document will trip 2LS and indicate to the logic function to inactivate the electric feed clutch 106 when the lead edge of the document reaches this limit switch.

Limit switch 7LS, having contacts 7LS-1B and 7LS-2A, operates in conjunction with the intermediate transport assembly. This limit switch indicates to the document feeder logic, the position of the intermediate transport assembly. It also supplies the logic following a paper jam to indicate that the intermediate transport assembly has been raised to clear the jam and that the transport assembly has been returned to an operational position thereafter. As shown in FIGS. 2–4 7LS is mounted on support plate 26 with an actuating arm contacting the machine frame when in an operative position. When the intermediate transport is raised, its actuating arm is relaxed to reverse the contacts 7LS-1B and 7LS-2A.

The utilization of the leading and trailing edges of the document in conjunction with limit switches 3LS and 4LS performs the task of changing the transport belts from a fast to a slow speed. Also, when the trailing edge of the document leaves 4LS, timing by the 2TR timer is initiated. This timer is relied upon to obtain exact document registration on the platen glass for the xerographic scanning.

Limit switch 5LS functions to ensure that the document transport system will not function with the platen transport belt raised. It also has in association relay K2 and contact K2-1. This contact ties in with the copier to provide the special document mode on the programmer.

The following sequence of events describe the effects of a normal feeding of a document by the automatic document feeder system to the platen glass.

The pressing of the "POWER ON" button of the reproducing machine energizes the associated AC logic lines in the document feeder circuitry. Reference is first made to the utilization of the energized line W-147. This puts power into the DC power supply including transformer T-1, full wave rectifier CR1 and filter capacitor C-3. The depression of the "FEEDER ON" button SW-1 pulls in the ADF on relay K4 which illuminates the "FEEDER ON" light DS1 and sets up the logic such that the only thing now required to start advancing a document in the tray is to press the "START-PRINT" button on the machine. If the "START-PRINT" button is not depressed, the "FEEDER ON" light DS-1 will merely remain illuminated. Pressing the "START-PRINT" button on the machine closes SW4A which parallels K1-2 contact, energizing the ADF sequence start relay K3. The pulling in of K3 closes contact K3-2 which energizes the motor delay relay K9. K9 is energized after the appropriate time delay as obtained through R21 and C13. The closing of K9-1 energizes the drive motor MOT-1 to the conveyor and friction rollers and starts feeding the documents via the intermediate transport belts onto the platen. The leading edge of a fed document will now trip 2LS. When 2LS closes, it pulls in K7, the feed clutch relay. Relay K7 is held in through contact K7-1. This action of K7 opens contact K7-2 to open the line to the feed clutch. The feed clutch being deenergized removes the mechanical driving force between the feed roll 60 and motor MOT-1. At this point, the intermediate transport belts are causing the advancement of the document, not the feed and reject rollers.

The leading edge of an advancing document next contacts 3LS and 4LS in that order. The movement of the leading edge over the actuator arm of 3LS closes the contact of 3LS which parallels normally closed contact K10-3. Because of the parallel logic path, 3LS does not immediately effect energization of the speed reducer 146. The movement of the leading edge over 4LS closes the normally opened contact 4LSA and energizes relay K10 which, in turn, opens contact K10-3 and closes K10-2 contact. The trailing edge then moves beyond 3LS. And at this time the speed reducer is deenergized and the speed of the document is changed. As the trailing edge of the sheet leaves the actuator arm of 4LS, relay K11 and document counter DCR are energized through a K10-2 contact. The opening of K11-3 contact prevents the operation of the ADF jam relay K19. The document counter DCR merely keeps a tabulation of documents forwarded by the unit. The energizing of K11 also opens contact K11-1 which removes the short across the timing capacitor C11 in the 2TR timer. This initiates the beginning of the timing cycle for the 2TR slow speed timer through K13-1B. After a several millisecond lapse, an RC unit comprising R16, R18 and C11 fires unijunction transistor Q2 to pull in K13 which is held in through holding contact K13-1A. The K13-2B contacts being switched deenergize the transport motor MOT-1 while contact K13-3 simultaneously applies power to relay K12, the copier start relay. K12 is energized following a delayed pull in which ensures that the document has stopped its motion on the platen prior to scan. When K-12 pulls in, the machine command is given to start the scanning of the document. In other words, when K12-1 closes and K12-2 opens, this gives the same effect as the operator pressing the "START-PRINT" button in normal machine operation.

With the machine ready for operation, 6CR and 14CR are energized as they would be in the normal mode of operation of the Osborne et al. machine. Energizing these two relays will initiate the logic to start the feed of paper from the paper support tray of the machine. When paper is being fed into the machine 4CR becomes energized, indicated that the reproducing operation has begun. At this time, line W-36 becomes energized pulling in relay K15 which is the ADF sequence reset. The pulling in of K15 opens K15-1 contact which drops out K3, the ADF sequence start relay which was holding in the control logic for the document feeder. At this point, the copier machine is making copies of the document on the platen in accordance with the number selected on the programmer of the copier. The process continues until coincidence is reached between the copy count and the number dialed onto the programmer.

Copy count coincidence occurs before the end of scan of the document. It is therefore not desired to eject the document until it has been scanned fully, a short time after coincidence. Coincidence is an indication to the ADF system to start the feeding of another document from the tray. Reaching coincidence applies power to line W–108. The energizing of line 108 energizes relay K1, the coincidence relay, which closes the K1–2 contact. Closing K1–2 contact pulls in K3, the ADF sequence start relay. With K3 energized, power is applied to time delay relay K9 through K3–2 contact. Even though coincidence has been reached, the motor is not started until K9 is energized to permit completion of document scanning. After this time delay, the motor acts to eject the document from the platen concurrently with the beginning of the feeding the next document from the document tray.

The aforementioned document feeding is continued in the above-noted manner until documents are exhausted from the document tray.

When there is no longer any paper in the document tray, the actuator arms of 1LS–1 and 1LS–2 project through apertures in tray 12 and limit switches 1LS–1 and 1LS–2 relax to their normal state. 1LS–1A and 1LS–2B had been held closed by the presence of paper as indicated by its associated actuator arm. The movement of the actuator arm through the aperture in the document tray opens 1LS–1A along with 1LS–2B. 1LS–2B gives steering logic for the indication that the last document has left the tray. But with no documents in the tray and the last document on the platen, we now need to eject the last document from the platen upon coincidence. This is effected by disabling the controlling feed logic. With no documents on the tray, 1LS–2B will be closed. Upon coincidence K1–4 will close. This pulls in K14, the last document ejection relay. This starts the platen belts running at a high speed with no documents to be fed from the document tray. In this area, there is employed one of the yet to be described jam timers and its associated relay K14 steering. When K14 energizes, it opens K14–3B and closes K14–3A. Then when K5–2 becomes energized, the K14 steering logic utilizes this signal, not to indicate a jam, but to energize K17 which deenergizes the ADF sequence start relay K3 which had been held in through K15–1 and self holding contact K3–1. Thus K17 performs the same function upon last document ejection as the ADF sequence reset relay K15 does during normal machine operation.

The following paragraphs will describe various supplemental and associated operating features of the ADF. An example will first be given of a paper jam condition. This is achieved through timing logic sensing an extended time lapse between the time a document should leave the document tray and its scheduled arrival on the platen. Whenever K3, the ADF sequence start relay, is energized, power is applied to the 1TR jam timer through K5–1B. The time constant of the 1TR timer is determined by the RC circuit of C9, R12 and R19 associated with unijunction transistor Q1. When Q1 fires, K5 is energized and held in through K5–1A, closing contact K5–2 which pulls in relay K19, the ADF jam relay. With K19 pulled in, contact K19–1B opens, which drops out K4, the ADF on relay. This interrupts the K4–2 self holding contact and opens K4–1 which removes power from the ADF sequence start relay K3. This in turn opens K3–4 and thus deenergizes the document feeder motor MOT–1.

At this time, the "CALL KEY OPERATOR" light begins flash on the machine console and the ADF jam light DS2, also marked "CALL KEY OPERATOR" illuminates on the document feeder through the closing of contact K19–2A to indicate the jam. Despite this, the reproducing machine may still be operated in its normal fashion. Obviously, however, the document feeder cannot be operated. The jam energizes relay K6, the steering relay for the "CALL KEY OPERATOR" copier jam light.

The ADF can only be run again by lifting the intermediate transport and returning it to its initial position after a jam has been indicated. This movement deactuates 7LS closing 7LS–1B. This energizes the other half of the relay K19 to reset the system, opening K19–2A and turning off the ADF jam light. The ADF is now ready to run again. All that is required to return the system to the aforementioned initial state is to press the "FEEDER ON" button. This also turns off the "CALL KEY OPERATOR" light on the console of the reproducing machine. Pressing the "POWER OFF" button of the reproducing machine during an ADF jam will not reset the document feeder since K19, the ADF jam relay, is a mechanical latching relay.

Shutdown of the automatic document feeder is effected by pressing the "FEEDER OFF" button, reversing SW2–A and SW2–B. This interrupts the K4–1 holding contact which deenergizes the ADF on relay K4, thus disabling all of the herein described feeder mechanism and the "FEEDER ON" light until the "FEEDER ON" button SW–1 is again pressed. Pressing the "FEEDER OFF" button when a document is being transported, energizes relay K18, the ADF cycle out relay, which initiates shut down of the unit, following registration of the document and the machine start cycle which energizes K15, the sequence reset relay. This is done because it is undersirable to interrupt the mechanism while a document is partially through a run.

In the various modes of ADF operation, the correct interfacing logic from the control of the "START-PRINT" button is obtained by steering start button relay K16. There are various conditions of control logic for K16. Under the normal starting operations with the document feeder on, K4–3 closes which energizes K16 through KI9–4B, K15–2 and K8–1. When K16 energizes, K16–2A and K16–3A are closed. This steers the "START-PRINT" button closure to the ADF unit which utilizes it as an indication to start a document moving from the tray. When the machine is making copies, KI5 is energized opening K15–2 contact thus dropping out the steering "START-PRINT" button relay K16. In this manner, any pressing of the "START-PRINT" button will not be received as a command to change document. The K18–2 contact, which parallels K4–3, provides the steering logic for energizing K16 when the "FEEDER OFF" button is pressed during the middle of the run. As can be understood, these contacts and their associated logic permit the correct utilization of the "START-PRINT" button for the various ADF-copier interface modes of operation.

The system also has logic to effect shutdown of the mechanism when the paper supply is low in the reproducing machine. Low paper shutdown will cause the "CALL KEY OPERATOR" light to flash in the reproducing machine and the machine will go into normal shutdown. But the automatic document feeder logic properly interprets this type of shutdown of the machine as an event which does not require a document change.

The start-print circuit has a slave copier jam relay K8 which energizes whenever we have a low paper shutdown or jam in the reproducing machine. Energizing of K8 sets up steering logic by opening the K8–1 contact which will drop out K16, the steering relay to the "START-PRINT" button. The "START-PRINT" button SW–4A normally causes document changing upon its depression. By opening K16–2A and K16–3A contacts, the steering logic from the machine "START-PRINT" button is replaced by the logic of K16–2B and K16–3B to permit the machine to start upon the pressing of the "START-PRINT" button following the jam condition or low paper condition. K16 will thus set up the logic on the "START-PRINT" button of the reproducing machine so that when the "START-PRINT" button is depressed, the reproducing machine will start without initiating a change of documents on the platen and without losing copy count on the programmer. If a jam occurs in the machine, or if a low paper shutdown occurs during cycle-out, the document feeder completes its cycle-out. In other words, we will have a movement of the document onto the platen before termination of the feeding. The document will remain on the platen until the machine jam or low paper condition is rectified. Pressing the machine "POWER ON" button would again initiate machine operation automatically but would not change the document on the platen at this time due to K12 being held in.

Reference is now made to the copier jam light, the "CALL KEY OPERATOR" light, in connection with a jam indication in the ADF unit. Normally K4–4 contact is closed with K2–4. A jam indication in the ADF unit energizes the jam logic K19 to close K19–4A to pull in K6. Energizing relay K6 closes the K6–2 contact which holds in K6 through the holding circuit associated therewith, and reverses K6–1A and K6–1B which maintains the copier "CALL KEY OPERATOR" light flashing until clearance of the jam. It is now required that the operator lift the document transport before clearing a jam. As soon as the document transport is lifted, the K19 reset coil is actuated deenergizing K19–4A which turns off the flashing "CALL KEY OPERATOR" light.

When a jam occurs, the ADF on relay K4 drops out. This again requires the operator to press the "FEEDER ON" button to resume the proper functioning of the feeder.

The 2TR slow speed timer functions in the starting of the copier from the ADF unit. K13, the 2TR relay, becomes energized a short time after the energization of 2TR. Energizing K13 will open K13–2B contact which will immediately stop the ADF motor indicating that the document is registered on the platen. Simultaneously therewith power is applied to relay K12, the copier start relay, which has a delayed pull-in. As soon as K12 is energized, the copying machine begins its start-print cycle. The time delay of K12 allows a full stop of the document before its scanning is initiated to insure no blurring of the copy due to full stoppage of the document in the platen.

The platen cover and its associated belt are controlled by 5LS, a normally closed limit switch, which when actuated, by a pivoting cam surface 189 on a side plate member 164, energizes K2, the document transport relay. With relay K2 energized, K2–3 contact is opened and K2–2 and K2–4 contacts are closed. Lifting the platen transport assembly during document travel from the tray to the platen causes K2–3 to close. K3–3 is closed at this time indicating that the ADF motor MOT–1 is running. This gives a direct indication of a jam which causes the ADF unit to go into an immediate shutdown to insure that no harm occurs to the operator or document while the platen transport is raised.

Lifting the platen transport when not operating the ADF, as to copy a three dimensional object, also causes K2–2 to open which drops out K–4, the ADF on relay which inactivates the ADF. This means that as long as the cover is lifted, the ADF unit cannot start. In other words, with K2–2 open, pressing the "FEEDER ON" button will not energize K4. It is required that the operator put the platen cover down before an operator can press the "FEEDER ON" button and resume the ADF cycle.

At the time of ejection of the last document, there are no longer any documents on the tray to be forwarded. When the last document has left the tray, 1LS–2B closes and 1LS–1A opens. Upon reaching coincidence, K1–4 closes energizing K14 which is held in by self holding contact K14–4 and which starts last document ejection. This is accomplished by closing K14–1 contact which starts the ADF sequence by activating the ADF motor without actually energizing the feed clutch due to K14–2 being opened. This begins the ADF cycle-out of the last document. In other words, the transport system runs at the fast speed for only a short period to effect last document ejection. This short ejection run is set up by the 1TR jam timer. At the end of this short period, K17, the ejection completion relay, will become energized through 1TR timer contact K5–2 and last document steering contact K14–3A. This opens K17–1 contact which stops the ADF sequence without actually giving a jam indication. It will put the ADF into the stand-by condition again with the ADF still on, requiring only that an operator put documents in a tray before feeding may be resumed. If documents are not put on the tray, the reproducing machine cannot be run until the "FEEDER OFF" button has been depressed. If the "FEEDER OFF" button is not pressed, documents must be inserted in the tray to operate the machine.

When the "FEEDER OFF" button is pressed and a document has just begun to be fed from the tray, power is applied to SW–2A so that immediately upon pressing the "FEEDER OFF" button K18, the ADF cycle-out relay is energized and held in through the K18–3 holding contact. This reverses the K18–1A and K18–1B contacts. This will, by parallel K4–1 contact, permit depressing the "FEEDER OFF" button without stopping a document in the middle of a run. K18–1A and K19–2B will carry the ADF unit through a cycle to bring the document to the platen without stopping the document transportation. K18–1B deenergizes the "FEEDER ON" light. If the document for some reason does not reach the platen and a jam occurs, K19–2B opens to stop the ADF unit and give a jam indication by flashing the "CALL KEY OPERATOR" light on the reproducing machine. The document feeder "CALL KEY OPERATOR" light comes on in the same manner as if the "FEEDER OFF" button were not depressed. Upon clearing of the jam in this condition, the operator must depress the "FEEDER ON" button to initiate a supplemental start of the document feed unit. The depression of the "START-PRINT" button of the reproducing machine actually begins the next document feeding.

While the present invention as to its objects and advantages, has been described herein as carried out in a specific embodiment thereof, it is not desired to be limited thereby; but it is intended to cover the invention broadly within the scope of the appended claims.

What is claimed is:

1. Apparatus for forwarding single sheets from a stack of sheet material including
   a conveyor roll,
   first drive means to rotate said conveyor roll in a sheet feeding direction,
   said conveyor roll including means to permit the conveyor roll to be rotated in a sheet rejecting direction,
   a reject roll in cooperable relationship with said conveyor roll,
   second drive means to rotate said reject roll in a sheet rejecting direction, said second drive means including a slip clutch to permit the conveyor roll to rotate said reject roll in a sheet feeding direction against the impetus of the said second drive means when no sheet or a single sheet is in the nip between said rolls but to permit the second drive means to rotate said reject roll in a sheet rejecting direction when the effective friction between said rolls is decreased as caused by a plurality of sheets being present between said rolls,
   first control means to automatically inactivate said first drive means upon the passage of a leading edge of a sheet beyond said rolls prior to the passage of the trailing edge of the sheet beyond said rolls so that said conveyor roll will counter-rotate under the frictional impetus of said reject roll after the passage of the trailing edge of the sheet from between said rolls, and supplemental conveying means to receive the leading edge of the sheet as it passes beyond said rolls and to pull the trailing edge of the sheet beyond said rolls against the drive of the reject roll.

2. The apparatus as set forth in claim 1 and further including sheet urging means to initiate the movement of a sheet into operative contact with said conveyor roll and reject roll.

3. The apparatus as set forth in claim 2 wherein said sheet urging means is a roller and further including means to move said roller into and out of operative contact with the topmost sheet in a stack of documents to be forwarded.

4. The apparatus as set forth in claim 3 and further including means to inactivate said second drive means after the trailing edge of a sheet has moved beyond said conveyor roll and reject roll.

5. The apparatus as set forth in claim 4 and further including means coupling said urging roll and said conveyor roll whereby movement of said conveyor roll in a sheet feeding direction will bring and retain said urging roll in operative contact with the topmost sheet in a stack of documents to be forwarded and whereby the counter-rotation of said conveyor roll will lift said urging roll out of contact with the stack of documents.

6. The apparatus as set forth in claim 4 and further including means to reactivate said first drive means and said second drive means.

7. Apparatus for feeding out sheet material in end-to-end spaced relationship from a stack of sheet material comprising in combination a conveyor roll, first drive means to rotate said conveyor roll in a sheet feeding direction, said conveyor roll including means to permit the conveyor roll to be rotated in a sheet rejecting direction, a reject roll, second drive means including a slip clutch to rotate said reject roll in a sheet rejecting direction with a force such that no sheet or a single sheet between said conveyor roll and reject roll will cause the reject roll to rotate in a sheet feeding direction under the frictional impetus of said conveyor roll, but to rotate said reject roll in a sheet rejecting direction upon an effective decrease in friction between said conveyor roll and reject roll as caused by more than one sheet being present between said conveyor roll and reject roll, an urging roll operatively coupled to one of said aforementioned rolls movable into and out of feeding relationship with the topmost sheet of a stack of documents to be forwarded by said conveyor roll and reject roll, means to counter-rotate said conveyor roll and said urging roll after a passage of the trailing edge of a single sheet beyond said conveyor and reject rolls to thereby cause the lifting of said urging roll out of sheet feeding contact with the topmost sheet of a stack of documents to be fed, and supplemental conveyor means to receive the leading edge of the sheet as it passes beyond said conveyor and reject rolls and to pull the trailing edge of the sheet beyond the conveyor and reject rolls against the drive of the reject roll.

8. The apparatus as set forth in claim 7 and further including means to inactivate said second drive means after the passage of the trailing edge of a fed sheet thereby.

9. The apparatus as set forth in claim 8 and further including means to reactivate said first and second drive means to refeed the next subsequent sheet on said back of sheet material.

10. Apparatus for sequentially feeding single sheets of documents in a stack in a programmed fashion comprising in combination a conveyor roll, first drive means to rotate said conveyor roll in a sheet feeding direction, said conveyor roll including means to permit the conveyor roll to be rotated in a sheet rejecting direction, a reject roll positionable in operative cooperation with said conveyor roll, second drive means operatively associated with said reject roll tending to rotate said reject roll in a sheet rejecting direction to prevent the passage of double sheets therepast, and to rotate said conveyor roll in a sheet rejecting direction when said first drive means is inactivated and no sheet material is between said feed and reject rolls, an urging roll operable to periodically move the topmost sheet from the stack of documents into operative contact with said conveyor roll and said reject roll, means operatively interconnecting said conveyor roll and said urging roll including drive means and a one-way clutch cooperable therebetween so that the rotation of the conveyor roll in the sheet feeding direction will cause the rotation of the urging roller in the sheet feeding direction and the counter-rotation of the conveyor roll will lock the one-way clutch to cause the counter-rotation of said urging roll and its lifting from the stack of sheet material, and supplemental conveying means to receive the leading edge of the sheet as it passes beyond said conveyor and reject rolls and to pull the trailing edge of the sheet beyond said conveyor and reject rolls against the drive of the reject roll.

References Cited

UNITED STATES PATENTS

| | | | |
|---|---|---|---|
| 2,224,137 | 12/1940 | Breman | 271—10 |
| 2,762,623 | 9/1956 | Uthenwoldt et al. | 271—36 |
| 2,950,675 | 8/1960 | Copping et al. | 271—36X |
| 3,044,770 | 7/1962 | Breuers | 271—36 |

EVON C. BLUNK, Primary Examiner

W. S. CARSON, Assistant Examiner

U.S. Cl. X.R.

271—38